N. L. JONES.
TEAKETTLE ATTACHMENT.
APPLICATION FILED MAY 16, 1919.
1,323,223.
Patented Nov. 25, 1919.
2 SHEETS—SHEET 1.
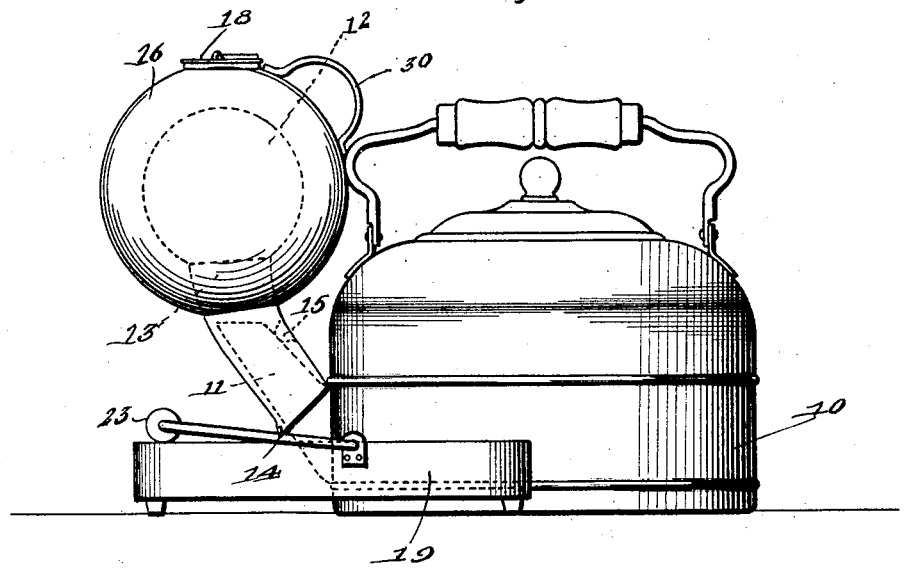
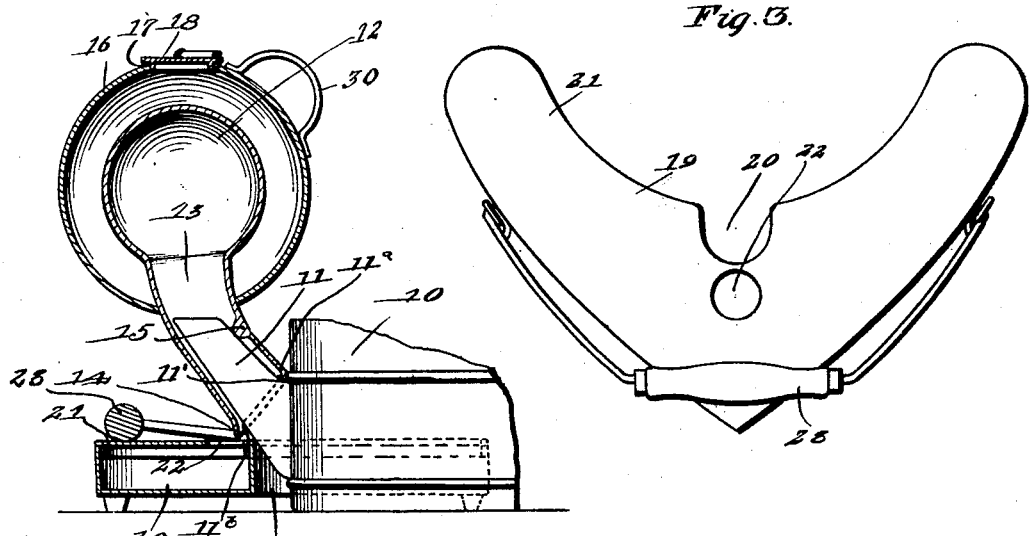
WITNESS:
R. O. Thomas
INVENTOR.
N. L. Jones
BY
Victor J. Evans
ATTORNEY.

N. L. JONES.
TEAKETTLE ATTACHMENT.
APPLICATION FILED MAY 16, 1919.
1,323,223.
Patented Nov. 25, 1919.
2 SHEETS—SHEET 2.
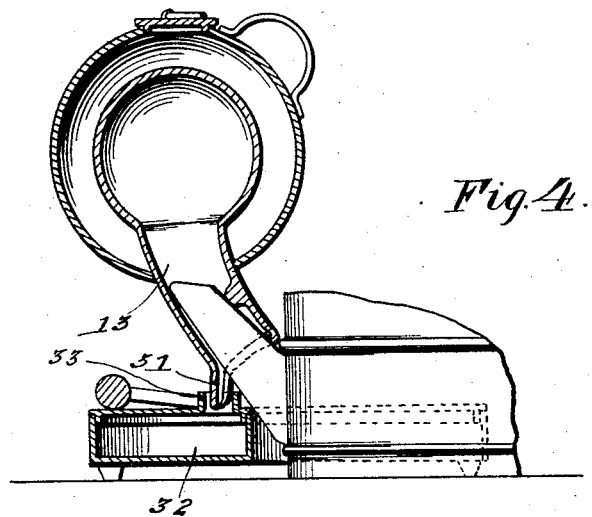
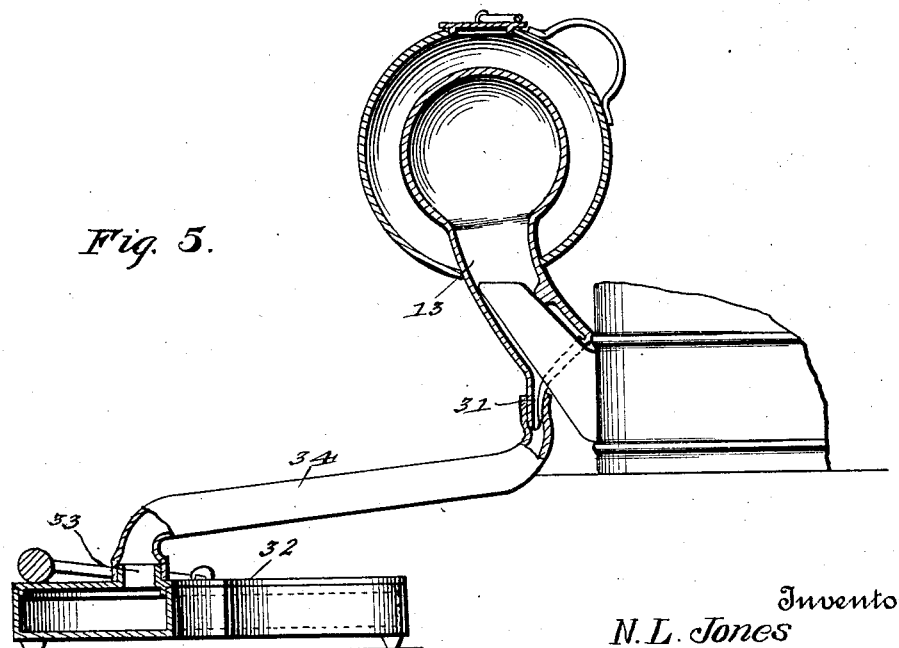
Inventor
N. L. Jones
Witnesses
R. A. Thomas
By Victor J. Evans
Attorney

UNITED STATES PATENT OFFICE.

NONIE LOUELLEN JONES, OF LAMAR, COLORADO.

TEAKETTLE ATTACHMENT.

1,323,223.   Specification of Letters Patent.   Patented Nov. 25, 1919.

Application filed May 16, 1919. Serial No. 297,583.

*To all whom it may concern:*

Be it known that I, NONIE LOUELLEN JONES, a citizen of the United States, residing at Lamar, in the county of Prowers and State of Colorado, have invented new and useful Improvements in Teakettle Attachments, of which the following is a specification.

This invention relates to water stills and aims to provide simple, economical and efficient means for distilling water for household purposes.

The primary object of the invention is to provide an attachment, which may be readily applied to or removed from a tea kettle or similar vessel, for collecting and condensing the steam arising from the spout of the vessel for the purpose of providing distilled water.

To this end the invention includes a condensing chamber, which communicates with the spout of the tea kettle and is surrounded by a chamber adapted to contain a suitable cooling agent, such as water, while a receptacle or vessel is so positioned as to receive the water from the condensing chamber as the steam is condensed.

The invention further includes the following novel details of construction, combination and arrangement of parts to be hereinafter more fully described and illustrated in the accompanying drawings.

In the drawings:

Figure 1 is a side elevation showing the invention applied to a tea kettle of the usual construction.

Fig. 2 is a vertical longitudinal sectional view of the same, only a fragmentary portion of the tea kettle being shown.

Fig. 3 is a plan view of the receiving vessel.

Fig. 4 is a sectional view similar to Fig. 2, showing a modified form of the invention.

Fig. 5 is a section similar to Fig. 4, but showing the receiving vessel spaced from the kettle and connected to the condensing chamber by a tube.

Referring to the drawings in detail, wherein like characters of reference denote corresponding parts, the tea kettle is shown at 10. This kettle is of any usual or preferred construction and is provided with the usual spout 11.

The invention resides in an attachment which is adapted to be placed upon the spout of the tea kettle for the purpose of receiving and condensing the steam arising therefrom and for conveying it into a suitable receiving vessel. It consists of a receptacle which is substantially in the form of a bottle, being provided with a body portion 12, which is preferably spherical in form and a restricted neck portion 13, the latter being slightly curved as shown. The neck 13 is provided with an open mouth through which the spout 11 is inserted and with a lip 14, the purpose of which will be hereinafter apparent. The neck 13 is of slightly larger diameter than the spout 11 and is provided upon the interior thereof with a lug or projection 15, positioned so as to contact with the said spout to hold the bottle or receptacle in the proper upright position. The lower or open end of the receptacle, that is the open mouth of the neck, is surrounded with an inwardly extending flange 11', having a groove 11$^a$ along its upper edge, said groove communicating with a passage 11$^b$ formed in the flange 11' at the lower end of the mouth.

Surrounding the body portion 12, is a substantially spherical receptacle 16, through which the neck 13 passes. The receptacle 16 is provided with an opening 17, having a closure 18 and as it is preferred to make the opening 17 and the mouth of the neck 13 of the same diameter, the closure will fit either of these openings. The receptacle 16 is spaced from the body portion 12 of the bottle and provides a chamber for the reception of water or any other cooling agent.

Steam arising from the spout 11 of the kettle 10 enters the body portion 12 of the bottle, which forms a condensing chamber, the water within the cooling chamber of the receptacle 16, serving to cool and condense the same which passes down through the neck 13. The condensed steam running along the inside walls of the neck 13 will be collected in the groove 11$^a$ of the flange 11' and be directed through the passage 11$^b$ at the lower end of the mouth and into a suitable receiving vessel. Any suitable material may be used for the manufacture of the device, it being preferred to employ a glass or other material which will not be affected by heat. In order to collect the water formed by the condensed steam, there is provided a receiving vessel 19. This vessel is substantially crescent shaped in plan and is provided with a notch 20 so as to receive the lower end of the spout 11 and fit around the circular bottom of the kettle 10. The receiving vessel 19 is open at the top and is provided with a lid 21, having an opening 22 therein which is positioned below the lip 14 so that the water passing through this lip will run through the opening 22 into the vessel 19. The vessel 19 may, if desired, be provided with a suitable handle 23.

If desired, two of the condensers may be employed so that when one becomes heated, the other may be substituted. If desired a handle may be provided for the receptacle 16, as indicated at 30.

In Figs. 4 and 5 there is illustrated a different form of the invention. In this form the neck 13 of the condensing chamber is provided, in lieu of the lip 14, with a relatively long or extended lip 31, which is substantially semi-circular in cross section and directs the condensed liquid into the receiving opening of a vessel 32. The receiving opening of the vessel 32 is surrounded by an upstanding annular flange 33, but in other respects is similar to the receiving vessel 19 previously described. By forming the neck 13 with the extension 31 and the receiving vessel with the flange 33, the said receiving vessel and the condensing chamber may be connected by means of a rubber or other flexible hose 34, so as to permit the receiving vessel to be placed in any desired position with respect to the tea kettle, as shown in Fig. 5 of the drawings. This renders the device useful where a small gas or other heater is used to heat the water within the kettle, the burner not being of sufficient size to support the receiving vessel.

The invention is susceptible of various changes in its form, proportions and minor details of construction and the right is herein reserved to make such changes as properly fall within the scope of the appended claims.

Having described the invention, what is claimed is:

1. The combination with a tea kettle, of a condensing chamber having an outlet mouth adapted to be positioned around the spout of the tea kettle, a cooling chamber spaced from and surrounding the condensing chamber and provided with a filling opening, a receiving vessel positioned below said spout to receive the condensation from the condensing chamber and a flange surrounding the mouth of the condensing chamber and having an inner flange provided with an outlet passage for directing the contents of the condensing chamber into the receiving vessel.

2. The combination with a tea kettle, of a condensing chamber adapted to be positioned over and in communication with the spout of said kettle and having a discharge mouth thereon, a cooling chamber spaced from and surrounding the condensing chamber and provided with a filling opening and an extension formed on the mouth of the condensing chamber for detachable connection with a discharge tube.

In testimony whereof I affix my signature.

NONIE LOUELLEN JONES.